United States Patent Office 3,418,351
Patented Dec. 24, 1968

3,418,351
RECOVERY OF HYDROFORMYLATION COBALT-CARBONYL-HYDROCARBYL-TERT-PHOSPHINE CATALYST COMPLEX
Charles R. Greene, Kensington, Calif., and William A. Brown, Houston, Tex., assignors to Shell Oil Company, New York, N.Y., a corporation of Delaware
No Drawing. Filed May 17, 1965, Ser. No. 456,560
6 Claims. (Cl. 260—439)

ABSTRACT OF THE DISCLOSURE

Method of converting a polar solvent-soluble nonionic hydroformylation cobalt-carbonyl-hydrocarbyl-tert-phosphine catalyst complex of the formula $[Co(CO)_3PA]_2$, where A is hydrocarbyl, dissolved in a polar solvent to an ionic cobalt-carbonyl-hydrocarbyl-tert-phosphine complex of the formula $[(AP)_2Co(CO)_3]^+[Co(CO)_4]^-$, where A is defined as above, having a lower solubility in said polar solvent, by treating the solution of nonionic complex with carbon monoxide at a pH no greater than 8.0, thereby rendering said complex isolable from said polar solvent, and subsequently separating said complex from said polar solvent.

---

This invention relates to the production of primary alcohols by the reaction of olefins with carbon monoxide and hydrogen in the presence of a hydroformylation catalyst complex. The invention relates more particularly to the recovery of catalyst for reuse in the process.

In hydroformylation and aldolization processes for the production of primary alcohols, such as described in Belgian Patent 606,408, Jan. 22, 1962; French Patent 1,345,-933, Nov. 4, 1963; and Belgian Patent 623,213, Apr. 4, 1963; higher boiling oxygenated materials build up in the continuous operation of these processes. In the normal continuous operation thereof, utilizing soluble cobalt carbonyl phospine catalysts, the hydroformylation catalyst complex is recovered from the end products and recycled in a solution stream. This stream also carries the higher boiling oxygenated impurities. As the concentration of these impurities increases in time, provision is made to discard a portion of the recycle catalyst solution stream, thereby lowering or maintaining at a constant level the concentration of the aforementioned impurities. Conventionally and conveniently this step is accomplished by purging a portion of the recycle catalyst solution stream. Such discard or purge, although a necessity by virtue of the build-up of impurities, wastes valuable catalyst dissolved therein. It is, therefore, an object of this invention to provide a method for recovering valuable hydroformylation catalyst from recycle catalyst solution purge stream.

The preferred hydroformylation catalyst complex of the aforesaid processes comprises cobalt in complex combination with carbon monoxide and tertiary hydrocarbylphosphines. This complex has a structure represented by the formula

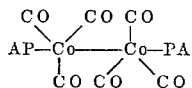

or the condensed formula $[Co(CO)_3PA]_2$, where A is hydrocarbyl, and is a nonionic material. Although nonpolar in character, this complex is highly soluble in polar organic solvents, especially neutral oxygenated compounds. This fact makes it possible to recycle the catalyst as a solution stream conveniently utilizing a portion of the polar end products of the hydroformylation processes, namely alcohols, aldehydes, and the higher boiling oxygenated by-products, as the polar solvent.

It has now been found that the catalyst can be recovered from the catalyst-containing recycle purge stream by chemical conversion of the catalyst to another species which possesses substantially smaller solubility in neutral polar organic solvents whereby recovery of the catalyst is possible by a convenient and practical manner. In its broadest aspects, the present invention comprises the conversion of a nonionic cobalt-carbonyl-hydrocarbyl-tert-phosphine complex dissolved in a polar solvent to an ionic cobalt-carbonyl-phosphine complex having a lower solubility in the polar solvent, thereby rendering the complex isolable from the solvent. The nonionic cobalt-carbonyl-phosphine complex, $[Co(CO)_3PA]_2$, when subjected to a pressurized atmosphere of carbon monoxide, can be converted to an ionic species having the formula $[(AP)_2Co(CO)_3]^+[Co(CO)_4]^-$. This ionic species has a lower solubility in neutral polar organic solvents and, indeed, can be precipitated therefrom, enabling its recovery by conventional techniques such as filtration, centrifugation, decanting with subsequent recycle of catalyst slurried in residue solvent, and the like.

The hydrocarbyl-tert-phosphine moiety of the aforementioned catalysts may suitably be a tertiary phosphine, such as trialkylphosphine, a trialkarylphosphine, a triarylphosphine, a triaralkylphosphine, or corresponding mixed phosphines, and the like. The hydrocarbyl components, designated by A in the previously described formula, need not necessarily be the same, and suitable tertiary organophosphine ligands also comprise the mixed phosphines wherein two or more of the three substituents satisfying the phosphorus valences are different members of the groups comprising alkyls (including cycloalkyls), aryls, aralkyls, alkaryls, and the like. A particularly preferred group of phosphines within the above-defined class are the trialkylphosphines in which each alkyl is an alkyl of from 1 to 20, and preferably from 4 to 15, carbons of straight or branched chain or cyclic structure. Representative examples of the trihydrocarbylphosphines include trimethylphosphine, triethylphosphine, tri-n-butylphosphine, trihexylphosphine, tridecylphosphine, di-n-butyloctadecylphosphine, tri-n-dodecylphosphine, triphenylphosphine, tris(dimethylphenyl)phosphine, tricyclohexylphosphine, diphenylbutylphosphine, and the like. Particularly preferred are tri-n-butylphosphine to tri-n-dodecylphosphine.

By hydrocarbyl-tert-phosphine is meant to include also the class of tertiary phosphines in which a divalent hydrocarbon radical satisfies two of the valences of the phosphorus atom, thereby forming a heterocyclic compound with a trivalent phosphorus atom. For example, a hydrocarbylene radical may satisfy two phosphorus valences with its two open valences and thereby forms a cyclic compound. The third phosphorus valence may be satisfied by any other hydrocarbyl radical. Preferred tertiary phosphines of this class are those wherein the hydrocarbylene radical is 1,4-hydrocarbylene and 1,5-hydrocarbylene and produce, respectively, the tertiary, five-membered heterocyclic phosphines described in copending U.S. application of J. L. Van Winkle, Ser. No. 418,296, filed Dec. 14, 1964 now abandoned, and the tertiary, six-membered heterocyclic phosphines described in copending U.S. application of R. C. Morris et al., Ser. No. 443,703, filed Mar. 29, 1965.

In a preferred mode of continuous operation of the hydroformylation and aldolization processes, the reaction zone is maintained at a high pH, i.e. an alkaline medium. As a result alkalinity is introduced to the recycle catalyst solution purge stream resulting in its having a high pH, usually about 11. Preferably, for converting the nonionic form of the catalyst to the ionic isolable form, the pH should be lowered. In its preferred form the invention comprises the recovery of a nonionic cobalt-carbonyl-hydrocarbyl-tert-phosphine complex from a recycle catalyst solution purge stream by reduction of the pH therein to a value no greater than 8.0 followed by treatment with carbon monoxide at a CO partial pressure of at least 150 p.s.i.g. and at a temperature no greater than 150° C. whereby the soluble nonionic catalyst is converted to a less soluble and more isolable ionic form for separation in part or in toto from the purge stream.

Optimum conditions for effecting the aforesaid conversion will depend in general upon the particular composition of the catalyst-containing recycle purge stream and may vary somewhat according to the composition of the catalyst itself. The temperature employed will accordingly be in the range of about 50–150° C., and a temperature of about 80–100° C. is suitable in most instances. The conversion is most effectively accomplished by maintaining a CO partial pressure of at least 150 p.s.i.g. Preferably the CO partial pressure for the conversion will be maintained at 60 p.s.i.g. higher than the CO partial pressure maintained in the precedent hydroformylation reaction. Higher pressures, of course, may be used if desired. Treatment time in the conversion step may be varied over a wide latitude; the treatment may be carried out effectively for as short a time as one hour to as long a time as 20 hours.

A simple manner of effecting the pH reduction is to add to the purge stream a saturated aliphatic carboxylic acid solution therein, such as, for example, formic acid, acetic acid, hexanoic acid, octanoic acid, nonanoic acid, decanoic acid, octadecanoic acid, and the like, whereby the pH is reduced to a value no greater than 8.0 and preferably to a value in the range of 3.0 to 8.0. In a few instances, such as with the lower aliphatic acids, alkali salts thereof may sometimes coprecipitate with the ionic isolable form of the catalyst. However, these may easily be removed therefrom by a water wash.

In some instances optionally adding an additional polar solvent, such as methanol, dimethyl sulfoxide, dimethylformamide, nitrobenzene, and the like, is helpful in increasing the rate and extent of conversion of the nonionic complex to the desired ionic complex salt. If sufficiently volatile, the added solvent can be flashed from the mixture after the conversion step, thereby reducing the solubility of the ionic complex salt and making the solvent available for reuse.

The method of the invention is particularly useful in the recovery of catalyst from the hydroformylation of lower olefins wherein a mixture of alcohols is obtained containing an alcohol of $n+1$ carbon atoms and an alcohol of $2(n+1)$ carbon atoms, where $n$ is the number of carbons in the olefin, especially in the manufacture of a mixture of n-butanol and 2-ethylhexanol from propylene.

The practice of the invention will be more fully understood from the following examples. Unless otherwise specified, the weight to volume relationship is that of grams to milliliters.

EXAMPLE 1

By way of example, but in no way limiting it, the method of the invention may be demonstrated in the specific hydroformylation and aldolization process for converting propylene to n-butanol and 2-ethylhexanol. Three feed streams are fed to a multiplicity of continuous flow reactors. One of the streams contains synthesis gas, a mixture of hydrogen and carbon monoxide in a 2:1 molar ratio. A second contains propylene and the third contains catalyst makeup. The catalyst makeup contains cobalt octoate and tributylphosphine dissolved in n-butanol and water and is fed to the reactors at a rate such that 0.5% wt. of the total reaction mass is cobalt. In the reactors under reaction conditions the catalyst makeup ingredients are converted largely to dicobalt-hexacarbonyl-bis(tributylphosphine) complex. Also fed to the reactor is an aqueous potassium hydroxide solution such that the molar ratio of KOH/Co is about 2. Carbon monoxide, hydrogen, and propylene react at about 500 p.s.i.g. and at 160–180° C. in the continuous flow reactors to form n-butanol and 2-ethylhexanol. The contents of the reactors next pass to a stripper where hydrogen, carbon monoxide, and propylene are vented to a recycle compressor and returned to the reactors. The alkanol products, n-butanol and 2-ethylhexanol, are taken off overhead in the stripper and passed to separation and purification units. As bottoms from the stripper is a solution of the nonionic dicobalt-hexacarbonyl-bis(tributyl-phosphine) complex dissolved in mainly n-butanol containing other end products of the process and high-boiling oxygenated by-product impurities. This stream is recycled to the reactors as the recycle catalyst solution stream. A portion of this principal recycle catalyst stream is purged to prevent buildup of the high-boiling oxygenated impurities. The catalyst is recovered from the recycle catalyst solution purge stream as follows: 172.3 parts by weight of purge stream comprising approximately 46% wt. of $C_4$ aldehydes and alcohols, 40% wt. of $C_8$ aldehydes and alcohols, and 14% wt. of oxygenated compounds heavier than $C_8$ was withdrawn to a 2000-volume autoclave. Analysis of the purge stream indicated that from the catalyst present in solution the purge stream contained 1.1 parts by weight of cobalt and 4.6 parts by weight of tributylphosphine. To lower the pH at least to 8.0, 5.3 parts by weight of octanoic acid was charged to the autoclave. While the red solution was stirred at 1500–1800 r.p.m., carbon monoxide was introduced to achieve a pressure of 700 p.s.i.g. and the autoclave was heated to 100° C. After that temperature was reached, the pressure was raised to 1000 p.s.i.g. by the addition of more carbon monoxide. The temperature was maintained at 100° C. for 85 minutes. The autoclave was then cooled rapidly, at about 5° C./min., to 25° C. A yellow precipitate had formed and was collected on a sintered metal filter, average pore size of 5 microns. The yellow precipitate was identified as the ionic complex salt $[Co(CO)_3(P(C_4H_9)_3)_2]^+[Co(CO)_4]^-$ from its infrared spectrum which exhibited a strong carbonyl band at 1890 cm.$^{-1}$, characteristic of the cobalt tetracarbonyl anion, and strong carbonyl bands at 1892 and 1997 cm.$^{-1}$, characteristic of cobalt-carbonyl-tributylphosphine. Recovered as the ionic salt was 69% of the cobalt initially present in the purge stream. By a repetition of the treatment on the filtrate from the yellow precipitate, an additional quantity of ionic salt was obtained raising the total recovery to 74% of the cobalt initially present in the purge stream.

Once recovered the ionic salt can be slurried in a solvent such as butanol and heated to drive off carbon monoxide thereby forming the initial nonionic complex for reuse in the hydroformylation reactors.

Alternatively, the ionic salt, though insoluble in the purge stream, may be dissolved in a more polar solvent and recycled to the reactors for in situ reconversion to the initial nonionic complex catalyst.

EXAMPLE 2

Recycle catalyst solution purge stream from Example 1 was treated in an autoclave according to the procedure described in Example 1 except that an in-line metal filter, average pore size of 10 microns, was used to collect the precipitate. The filtration was accomplished at varying temperatures shown in Table 1 to demonstrate that recovery of the ionic salt can be realized without complete cooling before filtering.

Table 1

| Approximate temperature of filtration, ° C.: | Recovery of cobalt, percent |
|---|---|
| 25 | 68 |
| 40 | 69 |
| 55 | 65 |
| 100 | 57 |

EXAMPLE 3

Recycle catalyst solution purge stream from Example 1 was treated following the procedure described in Example 1 except that synthesis gas was used in place of carbon monoxide. 173.3 parts by weight of purge stream was withdrawn to a 2000-volume autoclave. To lower, the pH, 4.5 parts by weight of octanoic acid was charged to the autoclave. Synthesis gas containing hydrogen and carbon monoxide in a molar ratio of 2:1 was introduced to achieve a pressure of 2000 p.s.i.g. By following the procedure of Example 1, a total of 40% of the cobalt initially present in the purge stream was recovered.

EXAMPLE 4

312.1 parts by weight of a recycle catalyst solution purge stream comprising approximately 7% wt. of $C_4$ aldehydes and alcohols, 18% wt. of $C_8$ aldehydes and alcohols, and 75% wt. of oxygenated compounds heavier than $C_8$ was withdrawn to a 2000-volume autoclave. Analysis of the purge stream indicated that from the catalyst present in solution the purge stream contained 2.3 parts by weight of cobalt and 7.5 parts by weight of tributylphosphine. The pH of the solution was lowered by adding 33.1 parts by weight of octanoic acid. By following the procedure of Example 1 accompanied by maintaining a temperature of 100° C. for 200 minutes and a carbon monoxide pressure of 1250 p.s.i.g., a total of 61% of the cobalt initially present in the purge stream was recovered.

EXAMPLE 5

The addition of a polar solvent to the recycle catalyst solution purge stream is beneficial for catalyst recovery since such addition is found to increase both the rate of conversion of soluble nonionic catalyst to the less soluble ionic salt form and the extent of formation of the ionic salt form.

Two equal-weight portions of a recycle catalyst solution purge stream similar to that described in Example 1 were each placed in an autoclave. In each portion of catalyst solution the pH, measured in 70% vol. of isopropanol— 30% vol. of water, was lowered from 10.9 to 7.2 by the addition of octanoic acid (ca. 8.8 parts by volume per 100 parts by volume catalyst solution). To one was added 30% vol. of methanol, but no addition was made to the other. The contents of the autoclaves were subjected to a pressure of 1250 p.s.i.g. with carbon monoxide and held at 100° C. for 100 minutes. The mixtures were then cooled to 25° C. before each was filtered to recover the ionic salt complex. Analysis of each precipitate indicated that in the presence of methanol a 93% conversion of soluble catalyst to the ionic salt complex was obtained together with a recovery of 75% of the cobalt initially present in the purge stream. In the absence of methanol a conversion of 85% with a recovery of 68% was obtained.

In all of the examples the size range of most of the precipitates of ionic salt complex was 5 to 10 microns in diameter and 60 to 120 microns in length. This range is the same for all cooling rates after conversion over the range of 0.3 to 5° C. per minute.

Concomitant with the advantage of recovering valuable catalyst is the advantage that in the recovery process of this invention there occurs no oxidation or destruction of the more fragile phosphine moieties of the catalyst complex. Still another advantage is that phosphine oxides and other phosphine degradation products normally present in the catalyst-containing recycle purge stream remain in solution during the recovery process of this invention and are not recycled to the continuous reactors as can occur in other catalyst component recovery systems.

We claim as our invention:

1. In a process of hydroformylating olefinic hydrocarbons to primary alcohols in the presence of a nonionic cobalt-carbonyl-hydrocarbyl-tert-phosphine complex as catalyst, the method of recovering the catalyst from a catalyst-containing recycle purge stream comprising higher boiling oxygenated organic liquid contaminants made in said process which consists essentially of reducing the pH of the purge stream to a value in the range of 3.0 to 8.0 and treating it at a temperature in the range of about 50–150° C. with carbon monoxide at a CO partial pressure of at least 150 p.s.i.g., thereby converting the soluble nonionic catalyst to a less soluble and more isolable ionic complex, and separating the ionic complex from the purge stream.

2. The method of claim 1 wherein the reduction of the pH is effected by the addition of an aliphatic carboxylic acid of 1 to 18 carbon atoms.

3. The method of claim 1 wherein the treatment with carbon monoxide is carried out at a temperature in the range of about 80–100° C.

4. The method of claim 1 wherein the treatment with carbon monoxide is carried out at a CO partial pressure maintained at 60 p.s.i.g. higher than the CO partial pressure maintained in the precedent hydroformylating process.

5. The method of claim 1 wherein the nonionic cobalt-carbonyl-hydrocarbyl-tert-phosphine complex is a cobalt-carbonyl-trialkylphosphine complex.

6. The method of claim 5 wherein the trialkylphosphine moiety of the complex is tri-n-butylphosphine.

References Cited

UNITED STATES PATENTS

| | | | |
|---|---|---|---|
| 2,865,716 | 12/1958 | Hasek | 23—203 |
| 3,239,569 | 3/1966 | Slaugh et al. | 260—632 |
| 3,340,306 | 9/1967 | Endler et al. | 260—604 |

OTHER REFERENCES

Metlin et al., Nature, vol. 183 (1959), pp. 457–8.
Hieber et al., Chem. Bu., vol. 93 (1960), pp. 462–7.

TOBIAS E. LEVOW, *Primary Examiner.*

A. P. DEMERS, *Assistant Examiner.*

U.S. Cl. X.R.

252—411, 431; 260—604, 632